July 14, 1936.  B. C. STICKNEY  2,047,235
INTERNAL COMBUSTION ENGINE
Filed June 29, 1931  8 Sheets-Sheet 2

Fig. 2.

Inventor:
Burnham C Stickney

Fig. 5.

July 14, 1936.  B. C. STICKNEY  2,047,235
INTERNAL COMBUSTION ENGINE
Filed June 29, 1931  8 Sheets-Sheet 5

Fig. 6.

Inventor:
Burnham C Stickney

July 14, 1936.  B. C. STICKNEY  2,047,235
INTERNAL COMBUSTION ENGINE
Filed June 29, 1931  8 Sheets-Sheet 8

Inventor:
Burnham C Stickney

Patented July 14, 1936

2,047,235

UNITED STATES PATENT OFFICE 2,047,235

INTERNAL COMBUSTION ENGINE

Burnham C. Stickney, Hillside, N. J.

Application June 29, 1931, Serial No. 547,628

45 Claims. (Cl. 123—53)

This invention relates to internal combustion engines, especially those of the two-cycle type.

The cylinders are inosculated, and charged by a pump.

Among the objects of the invention are to simplify the construction and operation, secure compactness and high speed, reducing weight and cost.

It is contrived to balance the engine-pistons in an improved manner by means of the pump-piston. The pump is between the engine-cylinders, and is connected to a crank-wrist diametrically opposite to the engine-wrists. The weight of the pump-piston may be equal to the weight of the two pistons combined, when the stroke of the pump-piston is equal to that of the engine-pistons. The weight of the pump-wrist may be equal to the combined weight of the two engine-wrists.

Undue separation of the inosculated engine-cylinders may be avoided.

Compacting of the engine-cylinders with the pump-cylinder is gained by placing the pump considerably out of line with its two engine-cylinders.

To secure perfect counterbalance of the engine-pistons by means of the pump-piston at all points in the stroke, each piston is connected to its wrist by means of a rigid rod, having a transverse slot in which the shaft-wrist may play. The center of gravity of the running engine never varies.

Certain of the present improvements may be embodied, however, in engines having the pistons otherwise connected with the crank-wrists.

Another feature of the invention is that the number of impulses per engine revolution may be multiplied, and compactness as well as low cost and weight may be secured, by the combination of two clusters of engine and pump pistons, mutually balanced, the clusters placed diametrically opposite to each other, each of the piston-rod structures rigidly connecting two opposed pistons, forming a duplex piston structure or frame.

This gives two evenly spaced explosions per shaft revolution, since the engine-piston at one end of the duplex unit is having an explosion stroke while the piston at the other end of the same unit is having its compression stroke.

The two duplex piston units of the engine, taken together, are perfectly balanced by the duplex pump unit or frame. The pump-wrist is flanked by the two engine-wrists, and the heavy pump-piston-frame mass moving in one direction is for smooth running, located half way between and close to the half-weight engine-piston-frame masses moving in the opposite direction.

Four clusters of pump and engine pistons at one side of the crank-shaft may balance four clusters on the opposite side of the shaft. The center of gravity of the engine is nearly as low as the crank-shaft, which is an advantage in automobiles.

Other features and advantages will hereinafter appear.

In the accompanying drawings.

To each engine-crank-wrist 20 of a crank-shaft 21 are connected two pistons 22 opposed diametrically of the shaft. There are sixteen engine-pistons shown. Diametrically opposite piston-rods 23 and an integral rectangular midway frame 24, rigidly connect the pistons, the frame having a slot 25 at right angles to the pistons. The frame may be forged or formed in one piece with the opposite rods and pistons, for lightness and sturdiness.

In each cross-slot fits a split slide-block 26, journaled upon the crank-wrist 20. To afford broad sliding surfaces, the sides of the slot are formed with opposite bearing-flanges 27, wear upon which may be taken up by means of shims, if desired. Each rod 23 may be formed of laterally-opposite portions, which may be separate continuations of the opposite sides of the cylindrical piston-shell, Figures 1, 8 and 9. The halves of the split block are bolted together at 28.

The bearing-flanges 27 project from opposite sides and stiffen the thin frame 24. Each flange has two finished surfaces, one at each side of the frame 24, for convenience in manufacturing, so that the flange-finishing tools may clear the frame itself. The slide-block may be correspondingly provided with clearance grooving at 29, between its finished bearing-surfaces. The block-portions are joined on the horizontal plane of the wrist-axis. Each of these duplex-piston frames of the engine moves in a straight line diametrically of the engine-shaft. The slide-block moves from side to side of the transverse slot in the midway head of the frame.

Figures 3, 4:
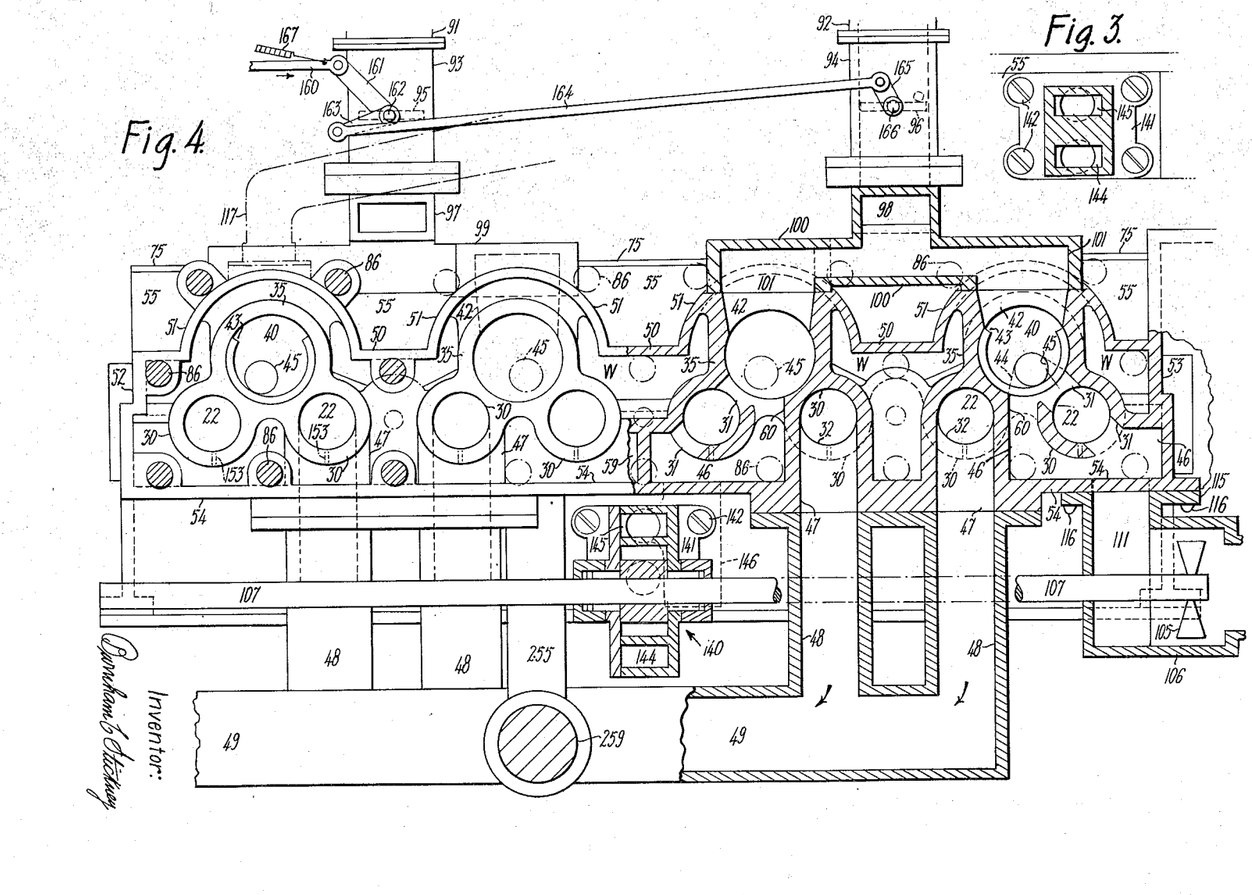
Figure 3 is a side elevation of a fragment of the crank-case, showing oil-circulation ports.
Figure 4 is a part-sectional side elevation of one of the engine-blocks, showing also the novel throttling means, etc.

In an automobile-engine, the engine-cylinders 30 may be horizontal. In the elevations at Figures 1 and 6, the engine-cylinders 30 are paired, those in each pair lying closely side by side, and there being four pairs of cylinders 30 in each of the two opposed engine-blocks, one of which is shown at Figure 4 and the other at Figure 6 or 8. The invention may be utilized with either more or less than four pairs at each side of the crank-shaft.

In each pair, one cylinder has at its inner end opposite intake ports 31, and the other has at its inner end an exhaust port 32, all ports being opened and closed by the pistons. At their outer ends the cylinders in the several pairs are joined by inosculation passages 33, into which may extend spark-plugs 34, Figure 1, said passages forming the compression chambers of the engine. The pistons in each pair may move alike, together with their diametrically-opposite companion pistons. Since the engine-wrists 20 in each pair are in line, it follows that both duplex-piston frames 24 in each group may move as if made in one piece.

With each pair of engine-cylinders is clustered a pump-cylinder 35, compactness being secured (to avoid undue length of inosculation passage and undue capacity of compression-chamber 33) by locating the pump in the niche or opening formed by the divergent walls of the associated two engine-cylinders, and by merging the pump-walls with the engine-cylinder walls, Figure 4. The stroke of the pump-piston is the same as that of an engine-piston; and the weight of the duplex-pump-piston-frame is equal to the combined weight of the two associated duplex-engine-piston-frames, so as to counterbalance them. Thus each group may be balanced.

Each pump-wrist 38 is diametrically opposite the combined engine-wrists 20, and is enlarged and weighted so as to secure rotative balance; and the same is true of the pump-slide-block 39. The pump-wrist 38 is midway between the engine-wrists 20 in each group, with a corresponding midway portion for the duplex-pump-piston-frame 41, Figure 6, which of course moves always in the opposite direction and at equal speed with the duplex-engine-piston frames of the group, at all points in the revolution of the shaft.

Figure 5:
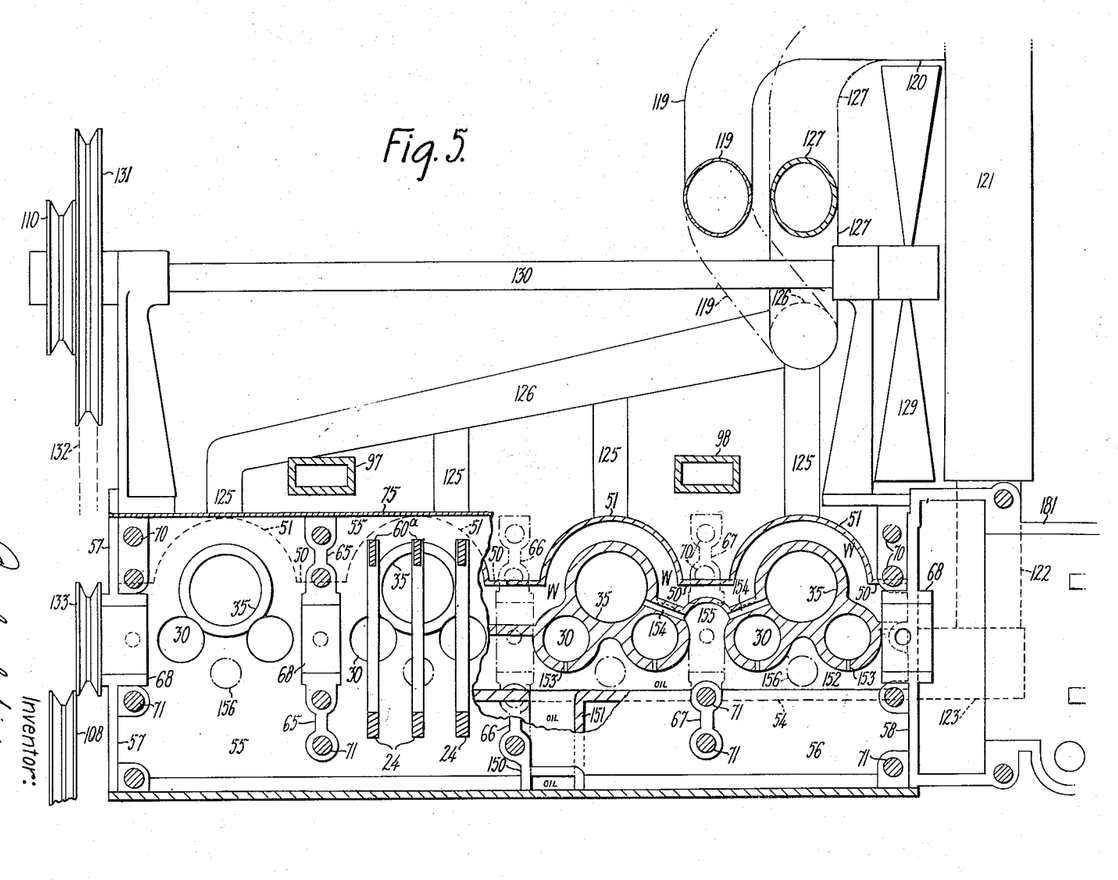
Figure 5 is a sectional side elevation taken on the vertical plane of the crank-shaft, and showing inner side of the other engine-block.

The pump-pistons 40 are in line, but offset above the axis of the crank-shaft, as indicated at Figures 4 and 5. Although thus offset, the pump-frame with its two pistons serves to counterbalance the two engine-frames with their four pistons.

There is only a negligible tendency of the pump-pistons to create friction due to their offset condition, since the pump is driven wholly by the shaft, and but little or no driving power has to be transmitted by the shaft to the pump-pistons when they are midway of the stroke, i. e., at the maximum point of offset from the shaft-axis.

Except for offsetting and increased size, the description of the duplex-engine-piston-frames applies also to the duplex-pump-piston-frames. It will be seen that all frames are of rigid construction, so that the piston forming one extreme end of any duplex frame affords material aid in guiding the piston that forms the other extreme end of the frame. This great length of guide is a desideratum, and steadies the pistons at the midway portions of the strokes, when the driving point is at one side of the axis of the shaft.

The stroke of each duplex-engine-piston-frame is cushioned at each end, by the act of compressing the charge in the engine-chamber. The stroke of the duplex-pump-piston-frame is also cushioned by the act of compressing the charge just taken in by the pump, preparatory to its delivery to the engine-cylinders. The cushioning conduces to quiet and smooth operation.

The slide-blocks afford broad and ample bearing-surfaces, securing ease of operation; and much power is transmitted from one piston directly through its frame to the opposite piston, effecting economy of friction and saving power.

Each pump-cylinder 35 has an intake port 42 which is closed by the pump-piston 40 to produce a vacuum during most of the intake stroke of the piston towards the crank-shaft. The piston has in its side an intake port 43, which opens a receiving port 42 in the pump-wall, Figures 1 and 6, at the concluding portion of the inward stroke of the piston; said port 43 being in the form of a notch or opening (Figure 4) cut in the brim of the hollow top of the piston, at Figure 8, at the outer end of the piston.

Upon the out stroke of the pump-piston, the receiving port 42 in the pump-wall closes at its inner end, and then the charge is compressed until a feed-port 44 in the inner end of the pump-piston (see right-hand end of Figure 4) opens the engine-ports 31 and their common reservoir 46 at Figure 4, so that the somewhat compressed charge passes through a flue 45 in the pump-piston (Figure 6), and out through feed-port 44 in the pump-piston and into one cylinder-port 31, and through a reservoir or chamber 46 partly surrounding the engine-cylinder, and thus to the opposite port 31 in the engine-cylinder, so that the charge enters at both ports 31.

The two engine-pistons are at this time at the inner ends of their strokes, and the pump-piston is at the outer end of its stroke.

The intake and outlet ports formed in the pump-wall are put into communication by the flue 45 extending longitudinally in the pump-piston. The feed-port 44 is closed at the start of the intake stroke of the pump-piston. Although the charge is compressed in the outer end of the pump, it must be delivered at the inner end of the engine-cylinder, just as the port 31 is uncovered by the engine-piston. The pump-piston, it will be seen, by means of the ported flue 45, serves as a conduit for the compressed charge, which is delivered directly from the compression chamber of the pump to the intake port 31 of the immediately adjoining engine-cylinder, when the pump-piston is at the extreme outer end of the compression stroke, at which time the ports 31 and 44 at Figure 4 will be in register (approximately this position being depicted at the sectioned piston at lower part of Figure 8); the remaining port 42 being closed at this time by the body of the pump-piston.

Figure 6:
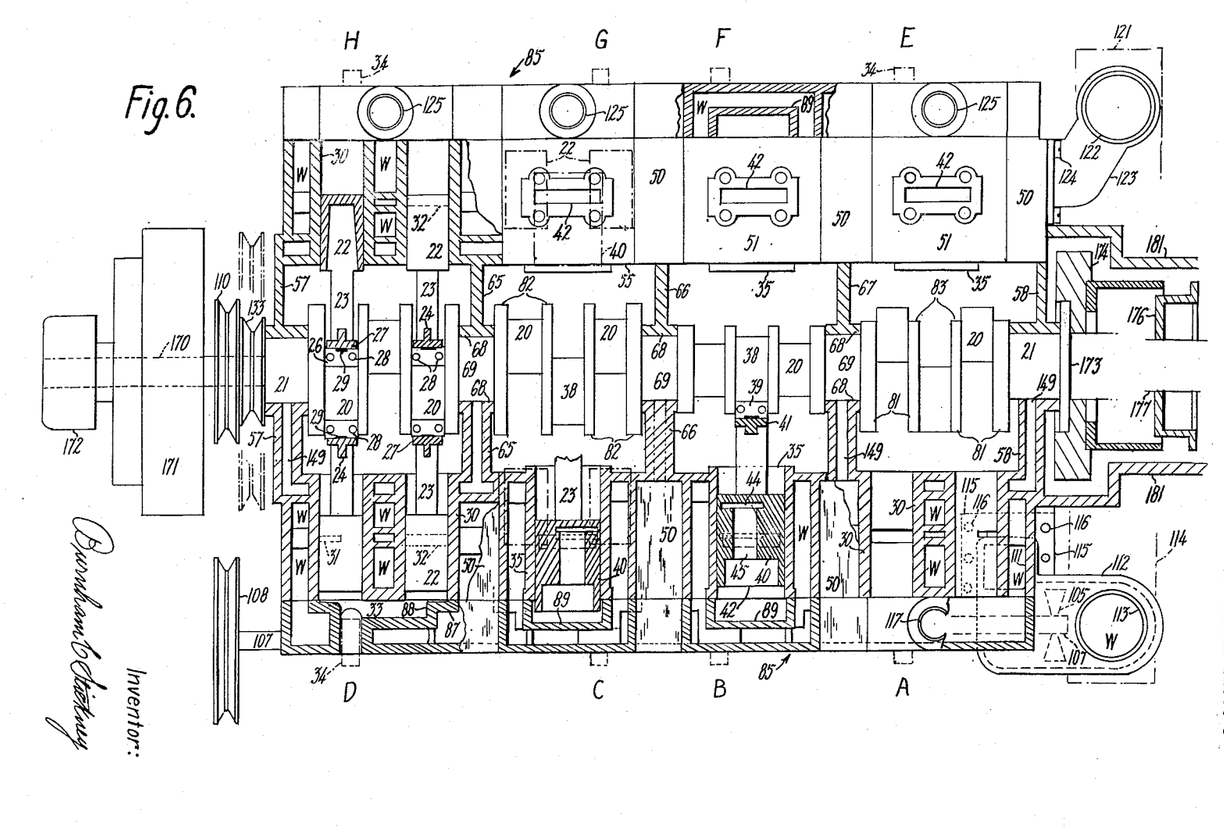
Figure 6 is a sectional plan of the engine.

The intake port 42 of the pump is shown at Figure 6. This figure shows the outer end of the port. The port grows smaller at its inner end.

The numeral 43 indicates the same part in all cases. This piston has a hollow top or is countersunk. The countersink leaves a brim or circular wall-portion. This brim is cut away at the port 43. The bottom of the cutaway is flush with the bottom of the countersunk portion in the piston. See Figures 4 and 8. The right-hand end of Figure 4 shows clearly the outer end of the pump-piston with its recess or countersink and the notch 43 in the wall of the recess, said notched recess forming the intake port of the pump-cylinder. The charge passes longitudinally of the pump-piston through flue 45, from which it escapes through the widening port or passage 44 to the general port-opening 31, 46, 31 of the engine-cylinder.

It will be seen that the necessity of a conduit-opening from the outer end of the pump and extending alongside of the pump inwardly to the engine-intake is avoided, and simplicity and compactness and durability secured, and other advantages gained.

The engine-intake ports 31 are opened at the end of the explosion-stroke of the engine-piston, and closed at the beginning of the compression-stroke. The compression is completed in the inosculation passage 33.

The engine is exhausted through port 32 in the companion cylinder, and the discharge passes down through ducts 47 and 48 to an exhaust manifold 49 beneath the engine. Preferably the exhaust cylinders of adjacent clusters are placed next to each other; while the intake cylinders of adjacent clusters may be also placed adjacent to each other.

The exhaust port 32 in the other engine-cylinder has a greater dimension than the intake ports 31, especially in a direction longitudinally of the cylinder, so that the cylinders may be substantially exhausted by the time that the intake ports open; and the intake charge, being under considerable compression, forces the exhaust gases out of the intake cylinder and also out of the compression chamber 33, and wholly or partly out of the exhaust cylinder, depending upon the speed of the engine and the initial pressure of the charge which has been delivered by the pump.

The compression stroke of the pump-piston 40 takes place towards the unported end of the pump. The piston keeps the port 42 closed during this stroke, and it also keeps the engine-intake port 31 closed until the concluding portion of the stroke, whereupon it is opened by the piston-port 44 at the inner end of the piston, so that it becomes unnecessary to provide a separate valve between the pump and the engine cylinder. The compressed charge passing through the flue 45 is delivered at 31 directly into the engine-ported chamber 46. This expansion takes place at the conclusion of the out-stroke of the pump-piston, which occurs at the conclusion of the in-stroke of the associated engine-pistons, and direct flow of the charge is secured, as the port 31 may be in line with the engine intake port 44.

Figure 1:
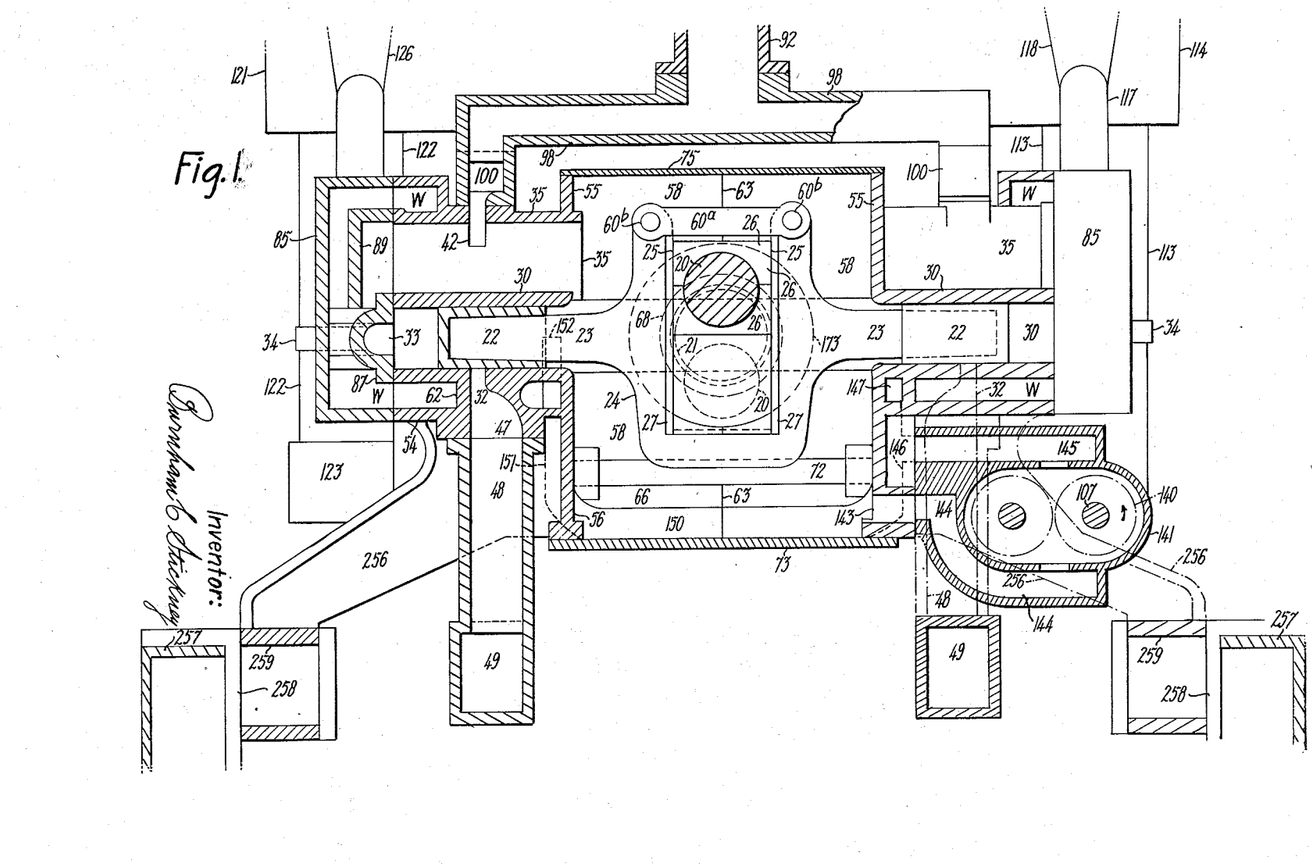
Figure 1 is a cross-sectional rear elevation of the engine.

The duplex piston-frame may have one side 60ª of its midway head hinged or pinned at 60ᵇ to the ends of the adjoining two sides thereof, as seen at the upper part of Figure 1.

For automobile use, the length of engine-piston stroke may be say 2¼ inches; the effective stroke (owing to depth of exhaust port 32) may be 1⅞; diameter of piston 1½; total piston displacement about 45 cubic inches. Speed may be 4000 revolutions per minute. The stroke of pump-piston may equal stroke of engine-piston. Pump-piston may have 2¼ inches diameter. Displacement about 5½ cubic inches. Effective stroke 1⅜. The clearance or compression chamber between the pump-piston and the engine-cylinder (including 31, 59) may equal about two-thirds of displacement of pump-piston, say 3.7 inches.

If, when the engine is running, the initial pressure in the pump is say 17 pounds absolute (2 pounds above atmospheric), and drops to 7 pounds absolute during suction stroke, at the end of which intake port 42 opens, and rises to 14 pounds absolute as the pump fills with the charge through port 42, and is raised say to 27 pounds absolute (12 above atmospheric), by the pump while both pump-ports are closed, this charge will suddenly expand into the engine-cylinders as soon as intake ports 31 are opened by the piston, dropping again to 17 absolute by the time the ports 31 close, and as the pump-delivery port closes at 44, 31. The effective displacement of the two engine-pistons fed by the pump may be about 5⅝ cubic inches, which added to the engine clearance is in excess of the effective cubic displacement of the pump-piston. At certain engine-speeds the charge will expand in the engine sufficiently to expel all the burned gas, but without incurring waste of fuel, since the pump is a measuring device and delivers no excess over what is needed in the engine-cylinders. Moreover in an automobile engine the supply of mixed air and fuel by the pump to the engine is controllable by the throttle-valves 95, 96.

The invention is not limited to electrically ignited charges of mixed air and fuel vapor; but for such engines there are shown eight spark-plugs, since each of the four clusters of doubled pistons delivers two impulses (eight in all) for each crank-shaft revolution. This engine with its 45 inch cubic displacement is therefore the equivalent of a four-cycle eight-cylinder engine having 90 cubic inches displacement. But the ordinary four-cycle eight-cylinder engine, owing to increase in length of stroke and weight of pistons, rods, and other parts, and lack of balance, could not be expected to make more than 2000 revolutions with the same ease and efficiency that the engine of this invention should make 4000 revolutions. The performance of this 45 cubic inch engine should therefore at 4000 revolutions equal that of an eight-cylinder four-cycle ordinary engine having 180 cubic inches capacity at 2000 revolutions.

One engine-block is seen at Figure 4, and the other at Figure 5, the engine-blocks being substantially similar, and each including a water-jacketing which is integral with the engine and pump cylinders. The water-jacketing also includes horizontal panel-portions 50 above the engine-cylinders, serving to connect semi-cylindrical water-jacketing portions 51 that cover the pumps. The ends of the water-jacketing are seen at 52, 53, and the bottom of the engine-block has a floor 54. The inner side of the jacketing is in the form of a wall 55, Figure 1, which is extended downward at 56 to form a side of the crank-case, the ends of the crank-case being seen at 57, 58.

Figure 8:
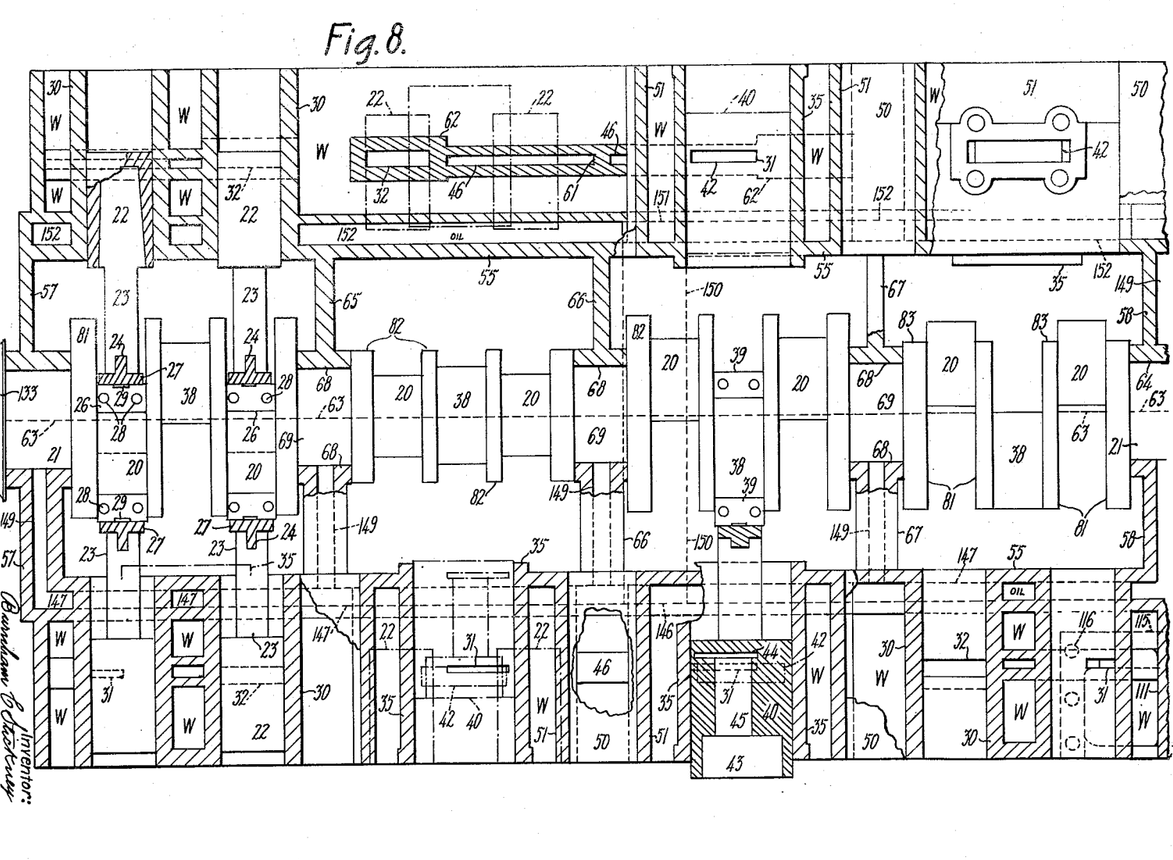
Figure 8 is a part-sectional plan of the engine-blocks, etc., on a larger scale than Figure 6.

In each engine group, the temporary storage chambers or courses 46 may adjoin each other, and may also adjoin the exhaust passages 32, as seen at Figure 8; in which figure the adjoining chambers 46 are shown separated by a partition 61; and the left-hand chamber 46 is shown as closed by the end of the conduit 62 having the exhaust port 32. The boxwork having these intake and exhaust passages divides the engine-head into inner and outer portions, but permits ample circulation of cooling water around the engine-cylinders, as well as around the pump-cylinders.

As will be seen at Figure 1, the exhaust pipes 48 descend at opposite sides of the crank-case.

Figure 2:
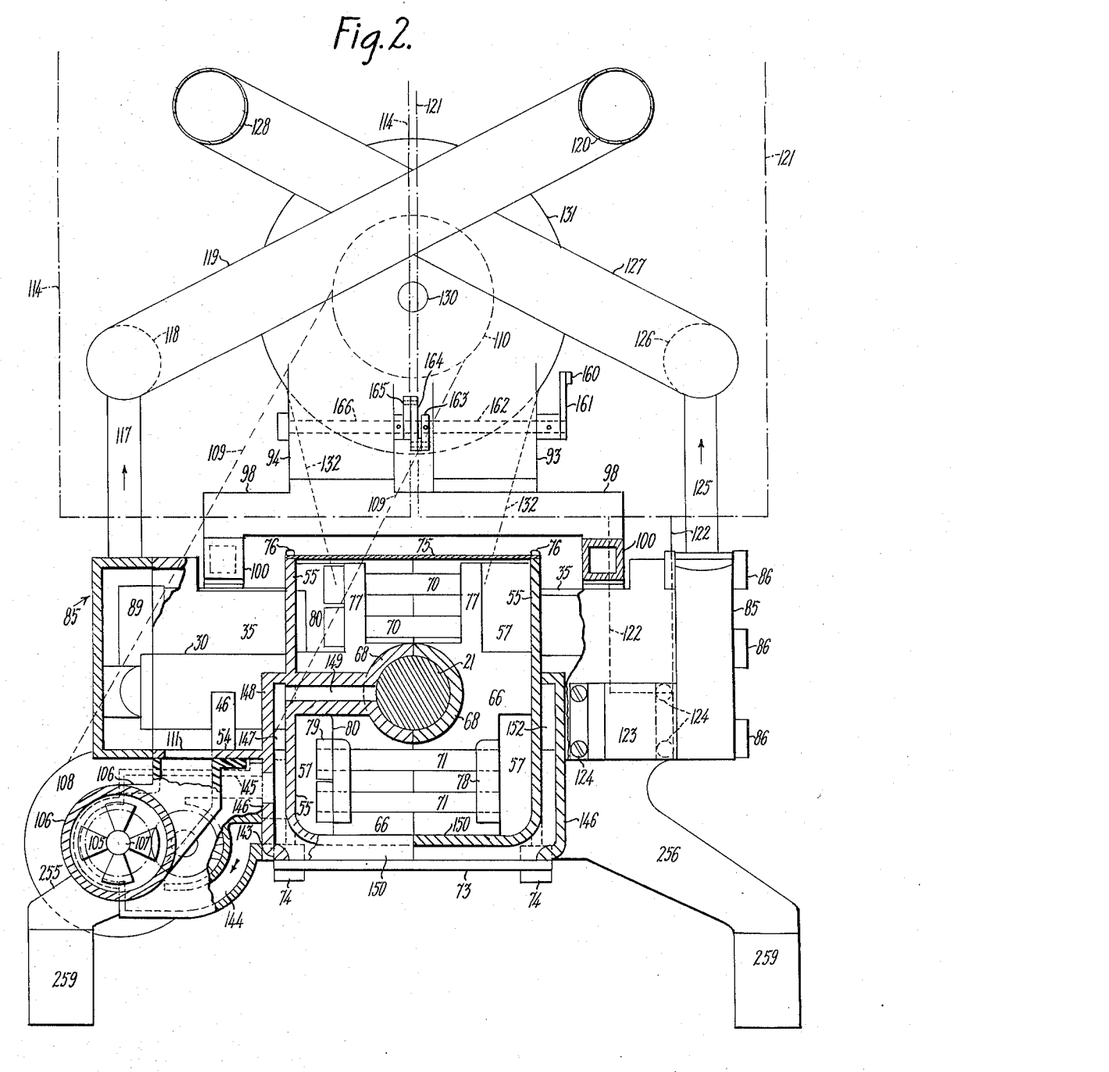
Figure 2 is a front cross-sectional elevation of the joined engine-block castings, water-circulation, etc.
Figure 7:
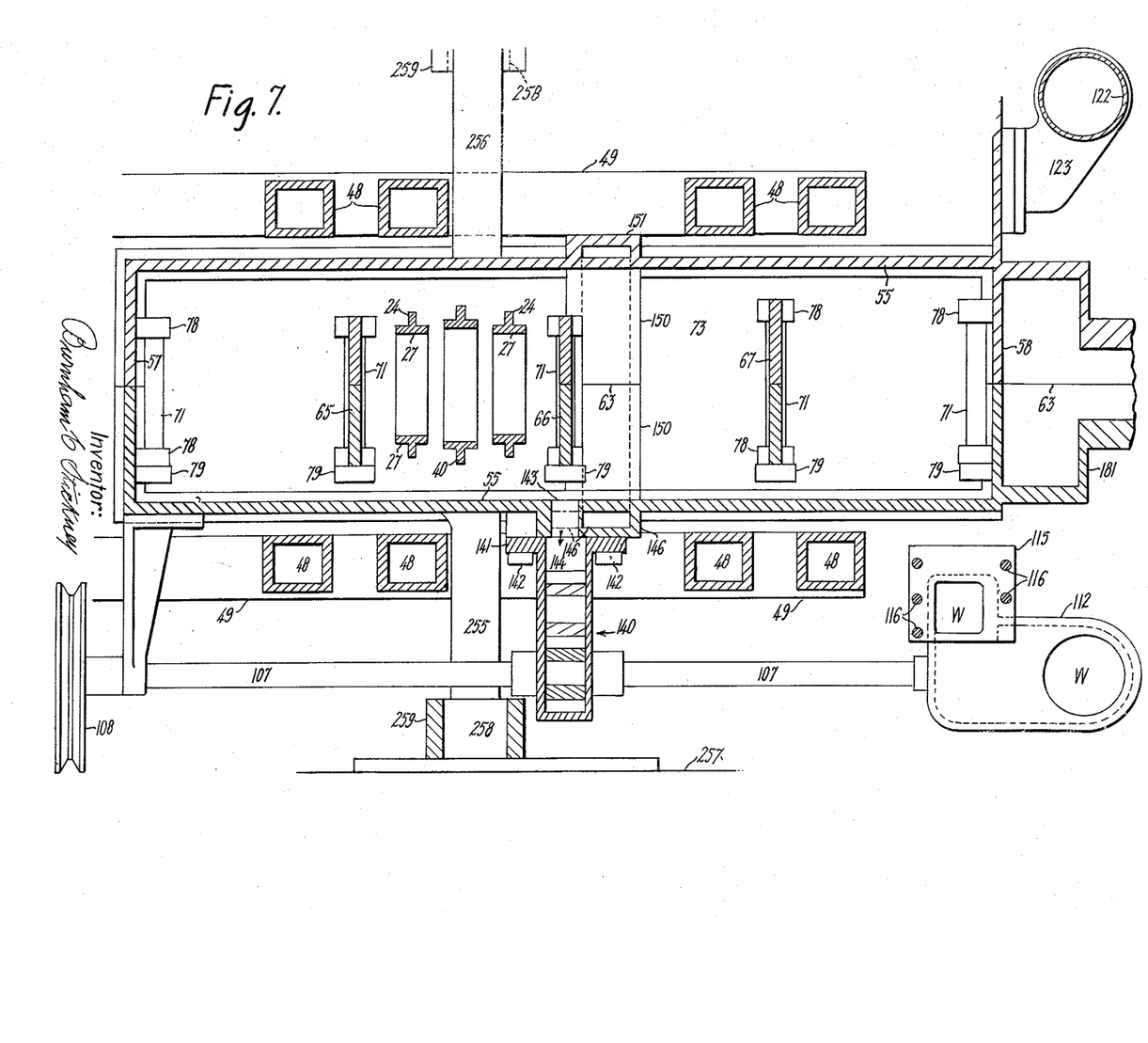
Figure 7 is a sectional plan, showing lower part of crank-case, exhaust manifolds, and other details.

As will be seen at Figures 2 and 7, the two engine-blocks are joined to form a rigid structure, the line of joining being indicated at 63. Each of the end walls 57 and 58 therefore consists of two joined sections, and each section carries a semi-cylindrical journal bearing 64 for the bearing portion 21 of the crank-shaft. Each engine-block is also provided with intervening vertical walls 65, 66 and 67, each having a bearing 68 for the bearing portion 69 of the shaft. The shaft thus may have five main bearings, the bearings alternating with the sets of crank-wrists, each set having three wrists 20 and 38.

The engine-heads are held together to form a rigid structure, and to journal the crank-shaft, by means of upper cross-bolts 70 and lower cross-bolts 71, and also by extra cross-bolts 72, Figure 1, if desired. There is thus made a tight joint at 63 between the matched wall-sections, Figure 1.

Said bolts 70 and 71 may be mounted in ears or flanges 77, 78, cast upon the partition walls and the end walls of the crank-case. The bolts may be entirely within the crank-case, and may be threaded at each end, each bolt being provided with a nut 79 to hold it in place after the crank-case is assembled. A clear space for insertion or withdrawal of the nut is left at 80 at the outer end of the partition.

Thus the opposite engine-heads are bolted directly to each other, each head being formed with one-half of the crank-case, the crank-case portions being fastened together by the same bolts.

The detachable bottom of the crank-case 73 may be made in a single plate 73 bolted at 74; and a cover-plate 75 may be bolted at 76 to the top of the crank-case walls 55.

The one-piece engine-shaft may be cut from a large bar. Its various wrists and bearings may be joined by integral webs 81, left in cutting down the bar. The webs may be at first be left circular; but portions may then be cut off from the opposite sides, leaving cutaway sides as at 82, Figure 9, and for balancing purposes one end of each web may be cut off, as at 83.

Figure 9:
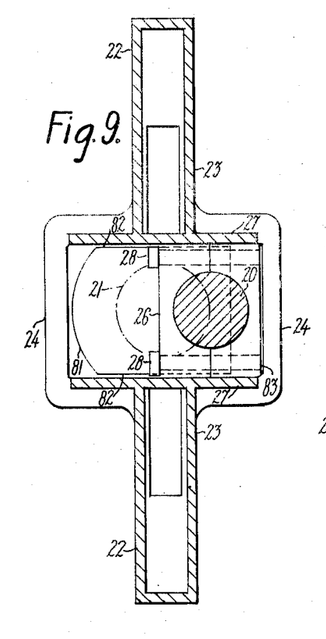
Figure 9 is a longitudinal section of one of the duplex piston-frames of the engine, shown in mid-stroke.
Figure 10:
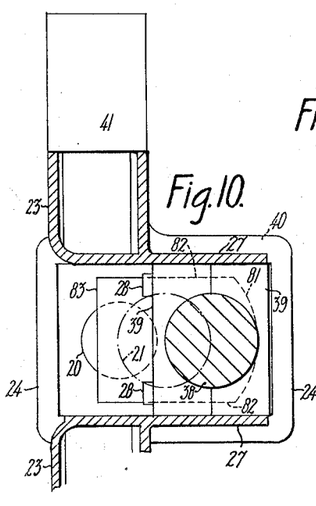
Figure 10 is a similar view of a duplex piston-frame of a pump.
Figure 11:
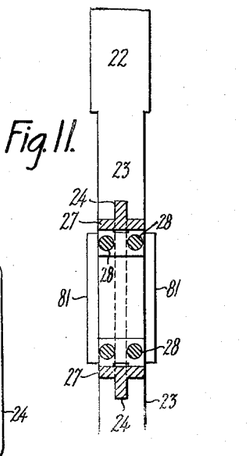
Figure 11 is a sectional plan showing a wrist of the crank-shaft and one-half of a slide-block thereon, and a duplex piston-frame co-operating therewith.
Figure 12:
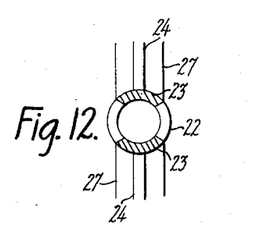
Figure 12 is a cross-section, showing the extended sides of the piston-shell cut out, to leave opposite stems, thereby forming the piston-rod extending to the midway cross-head.
Figure 13:
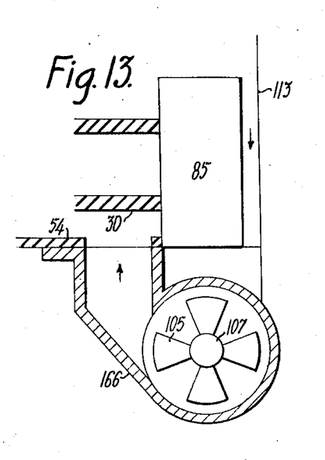
Figure 13 is a rear sectional elevation, showing the water-drum in which the propeller revolves, and the inlet to an engine-block.
Figure 14:
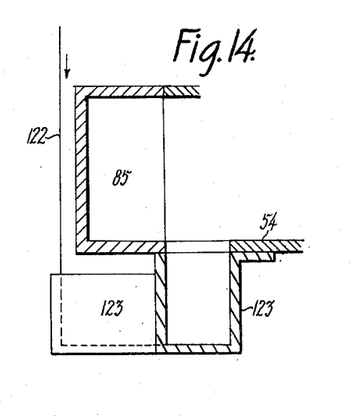
Figure 14 is a rear sectional elevation, illustrating the inlet from an opposite radiator to the opposite engine-block.

The cutting away of the sides of the webs permits the open one-piece duplex-piston-frames to be assembled or threaded upon the shaft, the width of the reduced web being less than the opening in the duplex-piston-frame, Figure 9.

These webs 81 serve as cranks, and stand at various radial angles; so that after passing one web or crank, the piston-frame with its pistons may be swung a little, in order to pass over the next web or crank with its different angle.

When any piston-frame is threaded past the intervening cranks 81 and reaches its appointed wrist, the halves 26 of the split block may be inserted singly within the slot or opening in the frame, and brought to position between the cranks and fastened together to complete the slide-block. In order to make room for inserting a half block, the piston-frame is displaced diametrically of the shaft, from the position at Figure 9, until the top of the frame rests against the wrist 20. This leaves ample space between the wrist and the opposite end of the frame, so that a half block may now be set within the frame and also slidden into position between the adjacent cranks. Then the shaft may be given half a revolution, and the piston-frame then displaced to the opposite side of the wrist, to leave a space on the opposite side of the frame for insertion of the other half block within the frame and between the cranks. Then the assembled half blocks may be fastened by the bolts 28.

In this way each duplex-piston-frame of the engine may be threaded along the shaft and mounted thereon by means of its split slide-block.

The duplex-pump-piston-frames may be similarly threaded along and mounted upon the pump-wrists of the shaft.

After all of the engine and pump piston-frames are mounted upon the shaft, one system of pistons may be presented to one engine-block, and the pistons inserted in the engine and pump cylinders thereof. Then the remaining engine and pump pistons may be presented to the opposite engine-block, and inserted into its cylinders. Then the engine-blocks may be fastened together by the bolts 70, 71. This operation also joins the halves of the crank-case, to render it tight; and also closes the fixed bearings 68 upon the five-bearing shaft 21.

Each engine-block is provided with a water-jacketed cap 85 secured by bolts at 86. Each cap has four integral heads 87, one head for each pair of engine-cylinders 30. These heads are double caps, each having the inosculating passage or compression chamber 33, which connects the two cylinders. At one end of the head, over one cylinder, is a spark-plug device 34. The other end of the head, over the other cylinder, has an abrupt wall 88 in suitable position for minimizing the explosion knock. The width of the compression chamber 33, seen at Figure 1, is only a fraction of the diameter of the engine-cylinder, so as to minimize the clearance.

Also integral with each cap 85 are four water-jacketed heads 89 for the pumps, connected to the outer side of the cap 85.

As will be seen at Figure 4, there are connected at 91, 92 two carburetors, from which lead conduits 93, 94, containing butterfly valves 95, 96. These conduits 93, 94 have branching cross pipes 97, 98, to enable each carburetor to supply four pumps, two at each side of the engine.

At their ends the cross pipes 97, 98 branch at 99, 100, the branches at each end being secured upon adjacent pumps. These branches have outlets 101 communicating with the intake ports 42 of the pumps. Said branches 99, 100 are fastened down upon the tops of the pumps in any suitable manner. The water-jacketing on the cap is arched at the pumps, as shown at 102; and the jacketing includes level panel-portions joining the arches 102, and matching the panels 50.

The cooling water may be circulated upon the siphon principle, the flow being aided by a water-propeller 105 in a drum 106, and mounted upon a horizontal shaft 107 parallel with the crank-shaft, and driven by a pulley 108 by means of a belt 109 from a pulley 110 upon the crank-shaft.

The propeller or water-pump 105 may be very small and serve only as a starter and accelerator. This propeller may be efficient to mix the water with the anti-freezing ingredients even when the engine is cold, but it is not powerful enough to drive the water at top speed through the water-jacketing and the radiator, and does not keep the water from warming when starting the engine. When warming up the engine, the movement of the water is sluggish, and it does not attain full speed until the engine is warm. The speed of the circulation is dependent largely upon the heating.

The water passes from the drum or chamber 106 into an inlet 111 in the bottom of the left-hand engine-head, viewed from the front. This inlet and the propeller 105 are at the front of the engine. The propeller-drum may have a front chamber to receive the lower end of the water-duct 113 descending from radiator 114; and it may have a plate or bracket 115, fastened up against the bottom of the engine-head by screws 116.

The incoming water circulates for the length of the left-hand engine-block around all the cylinders, and also circulates throughout the length of the engine-cap 85, and rises out of the cap through outlets 117 that rise from the tops of the arched portions 102 of the cap, the cap having substantially the same conformation as the engine-block itself.

The water rising in the outlets 117 is passed into a forwardly-extending main 118, rising at its forward end and bending across the engine diagonally to the left at 119, Figure 2, and leading to intake 120 that is provided upon the radiator 121, which stands edge to edge with radiator 114, the radiators being preferably of equal size.

The water is cooled in said radiator 121, and passes down through duct 122 to an intake coupling 123 that is secured by screws 124 to the forward end of the water-jacketing of the engine-block. The water circulates back to the rear of said engine-block, and of the cap 85, and emerges from the latter through uptakes 125, similar to 117, and flows into a main 126, which at its forward end leads to an inclined cross pipe 127 that is coupled at 128 to said radiator 114. The water is cooled in 114 and descends through duct 113 to the propeller-drum 105, completing the circulation. It will be seen that the water at each circulation passes twice through a radiating operation, and that the water is circulated through one engine-block after the other, even though the engine-block need have no direct water connection.

Both radiators may be cooled by a fan 129 upon a shaft 130 that is slowly revolved by a large pulley 131, upon the rear end thereof, driven by a belt 132 from pulley 133 upon the rear end of the crank-shaft. Shaft 130 extends the length of the engine. The pump-shaft 107 is driven slowly from the fan-shaft 130 by means of belt 109 leading from pulley 110 to pulley 108 on the pump-shaft. The fan-shaft is at the midway position relatively to the two radiators, and the fan spreads sufficiently to cool both of them.

The circulation runs from the propeller through one engine-block, then up to the cap, rising thence to the overlying main, then across to the radiator at the opposite side of the engine from the pump, and descends from the radiator to the other engine-block, rising from thence to the overlying main or manifold, and crossing to the other radiator, from which it descends to the propeller. There is ample water space in the propeller housing, so that the water can circulate upon the siphon principle past the propeller, if the latter should accidentally fail to operate. If it should be desired to vary the speed of the propeller, the belt may be shifted to another set of pulleys of suitable diameters which may be provided.

An oil pump 140 may be mounted upon pump-shaft 107. The pump-gears may be housed upon a bracket 141, secured by bolts 142 to a side 55 of the crank-case, which midway of its bottom has an opening 143 into a lower conduit 144 of the pump-housing, to supply oil to the pump-gears. The oil is forced into an upper conduit 145 in the housing, and delivered under pressure into a vertical conduit 146 that is cast upon the side wall 55 of the crank-case. Some of the oil rises into an oil main 147 that is separated by partition 148 forming part of the water-jacketing. The wall 55 forms the inner side of the oil main. Its bottom is the floor 54, and it underlies the engine-cylinders; all of these parts being integral.

The crank-shaft 21 is lubricated through ducts 149 branching inwardly from the oil main, and formed in the five crank-case cross-walls 57, 58, 65, 66, 67.

The remainder of the oil flows down and through a cross-conduit 150 (cast in the lower portions of crank-case wall-sections 66 at the middle of the crank-case), and rises in an opposite vertical conduit 151, which delivers the oil into a horizontal main 152, opposite to 147 and similar thereto. These oil mains extend the length of the engine, and the engine-cylinders are formed with bottom feed-holes 153 leading up therefrom. Feed-holes 154 from the pump-cylinders, are bored tangentially through neighboring engine-cylinder walls, and converge into pockets 155 that rise from the oil mains, each pocket serving two pump-cylinders. Holes cast in the walls of the oil mains may be closed by plugs 156.

There may thus be formed compactly and inexpensively a pair of simple castings to include the engine and pump cylinders, the water-jacketing, the oiling systems, and the side and cross-walls of the crank-case having the bearings for the shaft.

Flexibility of the operation of the engine (when charged with a mixture of fuel vapor and air from carburetor) is due partly to the capacity of the pump to fill its engine-cylinders with fresh charge when desired, and from the use of the throttle between carburetor and pump.

When the engine is throttled down, a partial vacuum still remains in the pump at the beginning of its compressing operation. As the compression proceeds, the pressure rises to atmospheric, and then above atmospheric; and the volume when at atmospheric pressure may be insufficient to fill the engine-cylinders. This reduced volume, at some pressure, however, does expand into the engine-cylinders, until balanced by pressure of exhaust gases, and may be sufficient to fill the intake engine-cylinder, or perhaps half fill it. The engine-pistons may then compress both the new small charge and the residue of burned-out gas. At the conclusion of the compression-stroke, the compressed new charge surrounds the spark gap, and is easily ignited, but the engine will run only at idling speed when the new charge is minimum. A range of speeds and power is therefore available by manipulating the throttle.

Further flexibility is provided by cutting out say two of the four engine-groups (each group having a pair of duplex engine-pistons and a duplex pump-piston), and using only the remaining piston-group or groups. As shown two groups may be cut out, and the shaft operated by the other two.

Each group is provided with its own supply, including the carburetor 91 for both the rear groups, and 92 for both the front groups. Any arrangement of cutting-out of groups may be provided, and the timing of the crank-shafts may be made to suit such arrangement, as for example, where only two adjacent groups are in use, the cranks thereof may be at right-angles to each other, to give four evenly-spaced explosions at every revolution.

A feature of the invention is that the group or groups that are out of use, are not entirely cut off from the fuel supply, but are given just sufficient gas to keep them running idly, so that they do not have to be driven by means of the other groups, so that the cut-out groups do not retard the engine.

Every group may thus be self-driving at all times, and may be called upon to do additional work as desired.

Preferably the throttling of both groups at Figure 4 is controlled by a single throttling connection 160 from the pedal and the steering column. This link operates a crank-arm 161 upon the shaft 162 of valve 95, to adjust the latter from fully-closed position at Figure 4 to fully-open position, thereby varying the speed of that portion of the engine which consists of the two rear groups.

The valve 95 may be used as a primary valve, since it may be turned to or past its half-open position, while the other valve 96 remains at idling position, as seen at Figure 4. Hence the rear groups of pistons will be effective drivers, while the forward groups merely idle.

If more power is needed, the crank 161 may be rotated farther, i. e., from half or two-thirds open position to fully-opened position, thus obtaining maximum power from the two engine-groups fed thereby.

During the final third of final half of the opening movement of primary valve 95, the secondary valve 96 is rapidly turned from its idling position to its fully-open position, so that the entire engine may deliver full power. To obtain this relative movement of the valves, a long crank 163 upon the main valve-shaft 162 is connected by a drive-link 164 to a short crank 165 upon the shaft 166 of the secondary valve 96. Owing to the the comparative shortness of the crank 165, its valve moves at great angular speed, as compared with the movement of valve 95, during the final portion of the opening movement of 95. In other words, the valve 96 gains rapidly upon 95, so that both may reach substantially open position together.

While 96 is opening, the supply of gas to both engine groups is increasing.

The flexibility of the engine is therefore augmented by the use of a plurality of valves entrained to open one after another, the speed of the latter valve being augmented as explained.

The link-pivots and the cranks are so placed that the rear end of the link swings about concentrically with its rear pivot while the valve 95 is opening to half or two-thirds open position. The link 164 has a toggle relation with the long crank 163, and is swinging around dead-center position during considerable of the opening movement of 95, during which opening movement valve 96 remains substantially stationary in idle or almost closed position; and valve 96 receives only a slight opening movement by the time that valve 95 is two-thirds open. The parts may all be returned to idling position by spring 167.

The order of firing of the cylinder pairs may be A C B D E G F H, A and B being at right angles to B and F, while C and G are at right angles to D and H but at an angle of 45 degrees to A and E. This firing order will give eight equally spaced even explosions at each revolution when both throttles are open. When only one throttle is opened, equally spaced strong explosions will occur in the driving cylinders C, D, G, H, and weak explosions in the idling cylinders A, B, E, F.

Variations may be resorted to within the scope of the invention, and portions of the improvements may be used without others.

Having thus described my invention, I claim:

1. The combination of inosculated engine-cylinders close together, a crank-shaft, a pump between said cylinders but offset therefrom and nested into the crevice between the engine-cylinders, a pump-piston, engine-pistons moving oppositely to said pump-piston, said shaft having a pump-wrist diametrically opposed to the engine-wrists and suitably weighted for counter-balancing the engine-wrists, and means connecting the engine and pump pistons to the crank-wrists, each wrist having a slide-block thereon, and rods rigidly connected to the pistons and having heads provided with cross-slots in which said slide-blocks work, the pump-rod having its slotted head offset; the mass of the pump-piston and its rod and head counterbalancing the mass of the combined engine-pistons, rods and heads, the walls of the engine-cylinders and pump-cylinder being merged together, the pump-wrist being between the engine-wrists.

2. A group of engine-cylinders and pumps, including two pairs of side-by-side engine-cylinders, a crank-shaft, the cylinders in each pair being inosculated, one pair being placed on the diametrically opposite side of the shaft from the other pair, there being opposite pumps, one for each pair of engine-cylinders, pistons in the engine and pump cylinders, means connecting each engine-piston with the opposite piston and with the crank-shaft, and means connecting the pump-pistons with each other and with the crank-shaft, said shaft formed with wrists for driving the pump-pistons oppositely from the engine-pistons, each pump-piston upon its out-stroke compressing a charge which expands into the associated engine-cylinders at the conclusion of the in-strokes of the engine-pistons, each pump-piston opening an intake port at the conclusion of its inward stroke, and opening a delivery port at the conclusion of its out-stroke.

3. Engine constructed according to claim 2, in which each pump-cylinder has an intake port which is closed by the pump-piston to produce a vacuum during most of the intake stroke of the piston towards the shaft; said piston having in its side at one end an intake port which opens a receiving port in the pump-wall at the concluding portion of the intake stroke of the piston, said intake port being at the outer or compression end of the piston; the pump-wall having a small outlet port opposite its said receiving port, and opening into the inner end of the adjoining engine-cylinder, and the piston having in its opposite side at its other end a discharge port, the piston having an open flue or passage extending from its intake port to its discharge port, sufficient capacity being provided between the pump-cylinder and the intake engine-cylinder to avoid undue compression of the charge, the intake engine-piston opening its port at the conclusion of the compression stroke of the pump-piston.

4. An engine having a plurality of groups of opposite pairs of engine-cylinders, opposite pump-cylinders and duplex engine and pump pistons as set forth in claim 2, the shaft extending along said groups and provided with corresponding wrists, and timed to cause the shaft to receive four or more evenly-spaced engine-impulses at each revolution.

5. An engine having a plurality of groups of opposite pairs of engine-cylinders, opposite pump-cylinders and duplex engine and pump pistons as set forth in claim 2, the shaft extending along said groups and provided with corresponding wrists, and timed to cause the shaft to receive four or more evenly-spaced engine-impulses at each revolution, the engine and pump cylinders at one side of the shaft forming a single block-casting, those on the opposite side of the shaft also forming a single casting, a single integral water-jacketing provided for all the cylinders in each casting, a crank-case being formed in opposite halves, each half integral with a cylinder-block, and means bolting the castings together upon the crank-shaft.

6. An engine having a plurality of groups of opposite pairs of engine-cylinders, opposite pump-cylinders and duplex engine and pump pistons as set forth in claim 2, the shaft extending along said groups and provided with corresponding wrists, and timed to cause the shaft to receive four or more evenly-spaced engine-impulses at each revolution, the engine and pump cylinders at one side of the shaft forming a single block-casting, those on the opposite side of the shaft also forming a single casting, a single integral water-jacketing provided for all the cylinders in each casting, a crank-case being formed in opposite halves, each half integral with a cylinder-block, means bolting the castings together upon the crank-shaft, said pumps surmounting the engine-cylinder pairs and having direct ports to the engine-cylinders, and having intake ports in their upper portions, and exhaust ducts extending downwardly from the under sides of the engine exhaust cylinders, the exhaust cylinders of adjacent clusters being placed next to each other, the intake cylinders of adjacent clusters being placed adjacent to each other.

7. An engine having a plurality of groups of opposite pairs of engine-cylinders, opposite pump-cylinders and duplex engine and pump pistons as set forth in claim 2, the shaft extending along said groups and provided with corresponding wrists, and timed to cause the shaft to receive four or more evenly-spaced engine-impulses at each revolution, the engine and pump cylinders at one side of the shaft forming a single block-casting, those on the opposite side of the shaft also forming a single casting, a single integral water-jacketing provided for all the cylinders in each casting, a crank-case being formed in opposite halves, each half integral with a cylinder-block, said pumps surmounting the engine-cylinder pairs, said crank-case halves each having end walls and transverse walls, each of said walls formed with a partial journal-bearing for the shaft, the bearings alternating with the sets of crank-wrists along the shaft, and cross-bolts joining said blocks above and below the engine-shaft, said bolts mounted in bosses formed upon the end walls and intervening cross-partitions.

8. An engine constructed according to claim 2, each duplex piston structure including two hollow pistons, a frame rigidly connecting the pistons and integral therewith and including a midway head having a cross-slot, stems or rods connecting the pistons to the midway head, each stem consisting of opposite continuations of the piston walls, the frame having bearing-flanges projecting from opposite sides and defining the edges of the transverse slot, each flange having two finished bearing-surfaces, one at each side of the frame, a crank-shaft having a wrist extending through the cross-slot in said duplex frame, and a slide-block upon said wrist and fitting between said flanges, said slide-block composed of half-portions detachably joined upon a line transverse to the direction of the slot in said frame, the shaft having cheeks between which the slide-block fits, said slot of sufficient dimensions to permit the frame to pass over a cheek, the frame being detachably mounted upon said wrist by means of said slide-block.

9. An engine having a plurality of groups of opposite pairs of engine-cylinders, opposite pump-cylinders and duplex engine and pump pistons as set forth in claim 2, the shaft extending along said groups and provided with corresponding wrists, and timed to cause the shaft to receive four or more evenly-spaced engine-impulses at each revolution, the engine and pump cylinders at one side of the shaft forming a single block-casting, those on the opposite side of the shaft also forming a single casting, a single integral water-jacketing provided for all the cylinders in each casting, a crank-case being formed in opposite halves, each half integral with a cylinder-block, and means bolting the castings together upon the crank-shaft, each engine-block being provided with a water-jacketed cap having internal integral heads for the engine-cylinder pairs, each of said internal heads having an inosculating passage for its engine-cylinders, and spark-plugs extending to said inosculating passages, the end of each passage opposite from the spark-plug terminating in an abrupt wall, the width of the inosculation chamber being much less than that of the cylinder; and each cap having water-jacketed heads for the pumps.

10. An engine having four groups of opposite pairs of engine-cylinders and opposite pump-cylinders as set forth in claim 2, the shaft extending along said groups and provided with corresponding wrists, and timed to cause the shaft to receive eight evenly-spaced impulses at each revolution, a manifold for the pumps of two of said groups, and a manifold for the pumps of the two remaining groups, the manifolds including cross-pipes each having connection for a carburetor, and each cross-pipe having at its ends a branch connected to two pumps.

11. An engine having a plurality of groups of opposite pairs of engine-cylinders, opposite pump-cylinders and duplex engine and pump pistons as set forth in claim 2, the shaft extending along said groups and provided with corresponding wrists, and timed to cause the shaft to receive four or more evenly-spaced engine-impulses at each revolution, the engine and pump cylinders at one side of the shaft forming a single block-casting, those on the opposite side of the shaft also forming a single casting, a single integral water-jacketing provided for all the cylinders in each casting, a crank-case being formed in opposite halves, each half integral with a cylinder-block, means bolting the castings together upon the crank-case, each of said engine-blocks having an integral oil-jacketing or main on the inner side of the water-jacketing, oil-conduits extending down the walls of the crank-case from said oil-jacketing, a cross-conduit joining said conduits at their lower ends, and an oil-pump drawing oil from the bottom of the crank-case and delivering oil under pressure to one of said conduits to fill the oil-jacketing, the latter communicating by inlets to the engine and pump pistons, said crank-case having end walls and intermediate partition-walls, and having journal-bearings fitted to the crank-shaft, all of said walls having ducts from the oil-jacketing to the journal-bearings to lubricate the shaft.

12. In a two-cycle engine, the combination with inosculated engine-cylinders, and a crank-shaft, of pistons working in said cylinders and connected to said shaft to move together, and a charging pump driven by said shaft and including a piston and cylinder provided with inlet and outlet ports and connected to said shaft to move oppositely from said engine-pistons, said pump-cylinder and said engine-cylinders all merging into one another, one of said engine-cylinders having an intake port opened by the piston at the conclusion of drive-stroke, and the other engine-cylinder having an exhaust port opened at the same time, whereby said intake port is closed by the engine-piston during nearly the entire time, said pump-ports being both closed by the pump-piston during nearly all of each stroke thereof, whereby back firing from the engine through the pump to the source of supply is prevented, said pump-piston having intake and delivery ports connected by a flue extending the length of the piston, the delivery port in the pump-cylinder directly adjoining the intake port in the engine-cylinder, and forming a single port therewith, the pump-cylinder not being ported to the other engine cylinder, the pump-ports opening at the conclusions of alternate strokes of the pump, the pump-piston being driven oppositely to the engine-pistons, and sufficient clearance being provided between the pump-piston and the engine intake port to avoid undue compression of the charge by the pump.

13. The combination of inosculated engine-cylinders, a crank-shaft, a pump between said cylinders but offset therefrom and nested into the crevice between the engine-cylinders, a pump-piston, engine-pistons moving oppositely to said pump-piston, said shaft having a pump-wrist diametrically opposed to the engine-wrists, and means connecting the engine and pump pistons to the crank-wrists, each wrist having a slide-block thereon, and rods rigidly connected to the pistons and having heads provided with cross-slots in which said slide-blocks work, the pump-rod having its slotted head offset; the mass of the pump-piston and its rod and head counterbalancing the mass of the combined engine-pistons, rods and heads, the pump-wrist being between the engine-wrists.

14. A group of engine-cylinders and pumps, including two pairs of engine-cylinders, a crank-shaft, the cylinders in each pair being inosculated and placed on diametrically opposite sides of the shaft, there being one pump for each pair of engine-cylinders, the pump being between the cylinders, pistons in the engine and pump cylinders, means rigidly connecting each engine-piston with its opposite piston, and means rigidly connecting the pump-pistons, each connecting means formed with a midway head provided with a cross-slot, the midway head of the duplex pump-piston being offset, said shaft formed with wrists for driving the duplex pump-pistons oppositely from the duplex engine-pistons, each pump-piston upon its out-stroke compressing a charge which expands into the associated engine-cylinders at the conclusion of the in-strokes of the engine-pistons, each pump-piston opening an intake port at the conclusion of its inward stroke, and opening a delivery port at the conclusion of its out-stroke.

15. An engine having a plurality of groups of opposite pairs of engine-cylinders, opposite pump-cylinders and duplex engine and pump pistons as set forth in claim 2, the shaft extending along said groups and provided with corresponding wrists, and timed to cause the shaft to receive four or more evenly-spaced engine-impulses at each revolution, the engine and pump cylinders at one side of the shaft forming a single block-casting, those on the opposite side of the shaft also forming a single casting, a crank-case being formed in opposite halves, each half integral with a cylinder-block, and means bolting the castings together upon the crank-shaft.

16. An engine having a plurality of groups of opposite pairs of engine-cylinders, opposite pump-cylinders and duplex engine and pump pistons as set forth in claim 2, the shaft extending along said groups and provided with corresponding wrists, and timed to cause the shaft to receive four or more evenly-spaced engine-impulses at each revolution, the engine and pump cylinders at one side of the shaft forming a single block-casting, those on the opposite side of the shaft also forming a single casting, a crank-case being formed in opposite halves, each half integral with a cylinder-block, and means bolting the castings together upon the crank-shaft, said pumps surmounting the engine-cylinder pairs and having direct ports to the engine-cylinders, and having intake ports in their upper portions.

17. An engine constructed according to claim 2, each duplex piston structure including two hollow pistons, a frame rigidly connecting the pistons and integral therewith and including a midway head having a cross-slot, stems or rods connecting the pistons to the midway head, a crank-shaft having a wrist extending through the cross-slot in said duplex frame, and a slide-block upon said wrist, said slide-block composed of portions detachably joined, the shaft having cheeks between which the slide-block fits.

18. An engine having a plurality of groups of opposite pairs of engine-cylinders, opposite pump-cylinders and duplex engine and pump pistons as set forth in claim 2, the shaft extending along said groups and provided with corresponding wrists, and timed to cause the shaft to receive four or more evenly-spaced engine-impulses at each revolution, the engine and pump cylinders at one side of the shaft forming a single block-casting, those on the opposite side of the shaft also forming a single casting, a crank-case being formed in opposite halves, each half integral with a cylinder-block, means bolting the castings together upon the crank-shaft, each engine-block being provided with a cap having internal integral heads for the engine-cylinder pairs, each of said internal heads having an inosculating passage for its engine-cylinders, and spark-plugs extending to said inosculating passages, the width of the inosculation chamber being much less than that of the cylinder.

19. An engine having groups of opposite pairs of engine-cylinders and opposite pump-cylinders as set forth in claim 2, the shaft extending along said groups and provided with corresponding wrists, and timed to cause the shaft to receive evenly-spaced impulses at each revolution, a manifold for the pumps of some of said groups, and a manifold for the pumps of the remaining groups, the manifolds including cross-pipes each having connection for a carburetor, and each cross-pipe having at its ends a branch connected to a plurality of pumps.

20. In a two-cycle engine, the combination with inosculated cylinders, and a crank-shaft, of pistons working in said cylinders and connected to said shaft to move together, and a charging pump driven by said shaft and including a piston and cylinder provided with inlet and outlet ports and connected to said shaft to move oppositely from said engine-pistons, the first of said engine-cylinders having an intake port opened by the piston at the conclusion of drive-stroke, and the second engine-cylinder having an exhaust port opened at the same time, whereby said intake port is closed by the engine-piston during nearly the entire time, said pump having no port to the second engine-cylinder, said pump-ports being both closed by the pump-piston during nearly all of each stroke thereof, whereby back firing from the engine through the pump to the source of supply is prevented, said pump-piston having intake and delivery ports connected by a flue extending the length of the piston, the delivery port in the pump-cylinder directly adjoining the intake port in the first engine-cylinder, and forming a single port therewith, the pump-ports opening at the conclusion of alternate strokes of the pump, the pump-piston being driven oppositely to the engine-pistons.

21. The combination of engine-cylinders, a crank-shaft, a pump between said cylinders but offset therefrom, a pump-piston, engine-pistons moving oppositely to said pump-piston, said shaft having a pump-wrist diametrically opposed to the engine-wrists, and means connecting the engine and pump pistons to the crank-wrists, each wrist having a slide-block thereon, and rods rigidly connected to the pistons and having heads provided with cross-slots in which said slide-blocks work, the pump-rod having its slotted head offset.

22. A group of engine-cylinders and pumps, including two pairs of engine-cylinders, a crank-shaft, the cylinders in each pair being inosculated and placed on diametrically opposite sides of the shaft, there being one pump for each pair of engine-cylinders, the pump being between the cylinders, the pumps being in line with each other but offset relatively to the shaft, pistons in the engine and pump cylinders, means rigidly connecting each engine-piston with its opposite piston, and means rigidly connecting the pump-pistons.

23. A system of engine-cylinders and pumps, including pairs of engine-cylinders, a crank-shaft, the cylinders in each pair being inosculated and placed on diametrically opposite sides of the shaft, there being one pump for each pair of engine-cylinders, the pump being between the cylinders, the pumps being in line with but opposite to each other and offset relatively to the shaft, pistons in the engine and pump cylinders, means rigidly connecting each engine-piston with its opposite piston, and means rigidly connecting the pump-pistons, each connecting means formed with a midway head provided with a cross-slot, the midway head of the duplex pump-piston being offset, said shaft formed with wrists for driving the duplex pump-pistons oppositely from the duplex engine-pistons.

24. A group of engine-cylinders and pumps, including two pairs of engine-cylinders, a crank-shaft, the cylinders in each pair being placed on diametrically opposite sides of the shaft, there being one pump for each pair of engine-cylinders, the pump being between the cylinders, the pumps being in line with each other but offset relatively to the shaft, pistons in the engine and pump cylinders, means connecting each engine-piston with its opposite piston and the crank-shaft, and means connecting the pump-pistons to each other and to the shaft.

25. An engine having opposite pairs of engine-cylinders, opposite pump-cylinders offset from the engine-cylinders, and engine and pump pistons, the shaft extending along said groups and provided with corresponding wrists, and timed to cause the shaft to receive four evenly-spaced engine-impulses at each revolution, the engine and pump cylinders at one side of the shaft forming a single block-casting, those on the opposite side of the shaft also forming a single casting, and means bolting the castings together upon the crank-shaft.

26. An engine having a plurality of groups of opposite pairs of inosculated engine-cylinders, opposite pump-cylinders offset from the engine-cylinders, and oppositely connected engine and pump pistons, timed to cause the shaft to receive four evenly-spaced engine-impulses at each revolution, the engine and pump cylinders at one side of the shaft forming a single block-casting, and those on the opposite side of the shaft also forming a single casting.

27. An engine having opposite pairs of cumbent inosculated engine-cylinders, opposite offset pump-cylinders, and engine and pump pistons, a shaft extending along said groups and provided with corresponding wrists, the engine and pump cylinders at one side of the shaft forming a single block-casting, those on the opposite side of the shaft also forming a single casting, said pumps surmounting the engine-cylinder pairs and having direct ports to the engine-cylinders, and having intake ports.

28. An engine constructed according to claim 2, each piston structure including two pistons, a frame rigidly connecting the pistons, and including a midway head having a cross-slot, stems or rods connecting the pistons to the midway head, the crank-shaft having a wrist extending through the cross-slot in said duplex frame, and a slide-block upon said wrist.

29. An engine having a plurality of groups of opposite pairs of engine-cylinders, opposite pump-cylinders and duplex engine and pump pistons as set forth in claim 2, each engine-block being provided with a cap having internal heads for the engine-cylinder pairs, each of said internal heads having an inosculating passage for its engine-cylinders, and spark-plugs extending to said inosculating passages.

30. An engine having groups of opposite pairs of engine-cylinders and opposite pump-cylinders as set forth in claim 2, a manifold for the pumps of some of said groups, and a manifold for the pumps of the remaining groups, the manifolds including cross-pipes each having connection for a carburetor, and each cross-pipe having at its ends a branch connected to a plurality of pumps.

31. The combination of engine-cylinders, a crank-shaft having coaxial wrists, engine-pistons coupled to said wrists to move together, a pump offset from said cylinders, a pump-piston, said engine-pistons moving oppositely to said pump-piston, said shaft having thereon a pump-wrist diametrically opposed to the engine-wrists, and means coupling the pump-piston to the pump-wrist on said crank-shaft.

32. The combination of inosculated engine-cylinders, a crank-shaft having coaxial engine-wrists, a pump between said cylinders but offset therefrom and nested between the engine-cylinders, a pump-piston, engine-pistons coupled by rod-members to said coaxial wrists and moving oppositely to said pump-piston, said shaft having thereon a pump-wrist diametrically opposed to the coaxial engine-wrists, and a rod-member coupling the pump-piston to said opposed crank-wrist on said shaft, the mass of the pump-piston and its rod-member counterbalancing the mass of the combined engine-pistons and rod-members.

33. A group of engine cylinders and pumps, including two pairs of side-by-side engine-cylinders, a crank-shaft, the cylinders in each pair being inosculated, one pair being placed on the diametrically opposite side of the shaft from the other pair, opposite pumps, one for serving each pair of engine-cylinders, a duplex piston-rod device connecting each engine-piston with the opposite piston and having a cross-slotted head device engaging said shaft, and a duplex piston-rod connecting the pump-pistons to each other and having a cross-slotted head device engaging said shaft, said shaft formed with wrists for driving the pump-pistons oppositely from the engine-pistons.

34. A group of engine cylinders and pumps, including two pairs of side-by-side engine-cylinders, a crank-shaft, the cylinders in each pair being inosculated, one pair being placed on the diametrically opposite side of the shaft from the other pair, opposite pumps, one for serving each pair of engine-cylinders, a duplex piston-rod device connecting each engine-piston with the opposite piston and having a cross-slotted head device engaging said shaft, and a duplex piston-rod connecting the pump-pistons to each other and having a cross-slotted head device engaging said shaft, said shaft formed with wrists for driving the pump-pistons oppositely from the engine-pistons, each pump being nested between its engine-cylinders, and the mass of the pump-pistons and their connecting rod substantially counterbalancing the pairs of engine-pistons with their connecting rods.

35. A group of engine cylinders and pumps, including two pairs of side-by-side engine-cylinders, a crank-shaft, the cylinders in each pair being inosculated, one pair being placed on the diametrically opposite side of the shaft from the other pair, opposite pumps, one for serving each pair of engine-cylinders, a duplex piston-rod device connecting each engine-piston with the opposite piston and having a cross-slotted head device engaging said shaft, and a duplex piston-rod connecting the pump-pistons to each other and having a cross-slotted head device engaging said shaft, said shaft formed with wrists for driving the pump-pistons oppositely from the engine-pistons, each pump being nested between its engine-cylinders, and the mass of the pump-pistons and their connecting rod substantially counterbalancing the pairs of engine-pistons with their connecting rods, the axis of the engine-shaft lying in the plane of each pair of engine-pistons, and the pump-pistons being offset, as set forth.

36. The combination of an engine-crank shaft, two pairs of engine-pistons connected to said shaft, each pair extending oppositely from the other pair and from said shaft, and a pair of pump-pistons extending oppositely from each other from said shaft, the engines in each pair being inosculated and served by one of the pumps, the shaft having engine and pump wrists connecting the pumps to move always in opposite directions from the pistons, to balance them at all points; one of the pistons in each pair having only inlet-ports connected to its service pump, and the other cylinder in each pair having only an exhaust port, the pump for each pair being contiguous to both engine-cylinders served thereby.

37. The combination of inosculated engine-cylinders, a crank-shaft, a pump nested between the engine-cylinders, a pump-piston, engine-pistons moving oppositely to said pump-piston, said shaft having diametrically opposed pump and engine wrists, and means connecting the engine and pump pistons to the crank-wrists, and rods rigidly connected to the pistons and having heads provided with cross-slots in which said wrists work; the pump-piston, rod and head mass counterbalancing the combined engine-piston, rod and head mass.

38. Engine constructed according to claim 37, in which each pump-cylinder has an intake port which is closed by the pump-piston to produce a vacuum during most of the intake stroke of the piston towards the shaft; said piston opening an intake port in the pump-wall at the concluding portion of the intake stroke of the piston, said intake port being at the outer or compression end of the piston; the pump-wall having a small outlet port opening into the inner end of the adjoining engine-cylinder, and the piston having at its other end a discharge port, the piston being open from its intake end to its discharge port, sufficient capacity being provided between the pump-cylinder and the intake engine-cylinder to avoid undue compression of the charge in the pump-cylinder, the intake engine-piston opening its port at the conclusion of the compression stroke of the pump-piston.

39. An engine constructed according to claim 2, each duplex piston structure including two hollow pistons, a frame rigidly connecting the pistons and integral therewith and including a head having a cross-slot, stems or rods connecting the pistons to the head, each stem consisting of a continuation of the piston-walls, the frame having bearing-flanges projecting from its sides and defining the edges of the transverse slot, each flange having a finished bearing-surface, a crank-shaft having a wrist extending through the cross-slot in said duplex frame, and a slide-block upon said wrist and fitting between said flanges, said slide-block composed of portions detachably joined, the shaft having cheeks between which the slide-block fits, the frame being detachably mounted upon said wrist by means of said slide-block.

40. In a two-cycle engine, the combination with two pairs of inosculated engine-cylinders, and a crank-shaft, of four pistons working in said cylinders and connected to said shaft to move together, and two charging pumps driven by said shaft and each including a piston and cylinder provided with inlet and outlet ports and connected to said shaft to move oppositely from its engine-pistons, one of said engine-cylinders in each pair having an intake port opened by the piston at the conclusion of drive-stroke, and the other engine-cylinder in each pair having an exhaust port opened at the same time, whereby said intake port is closed by the engine-piston during nearly the entire time, said pump-ports being both closed by their respective pump-pistons during nearly all of each stroke thereof, whereby back firing from the engine through the pump to the source of supply is prevented, each of said pump-pistons having intake and delivery ports connected by a flue extending the length of the piston, the delivery port in the pump-cylinder directly adjoining the intake port in the engine-cylinder, and forming a single port therewith, the pump-cylinder not being ported to the other engine-cylinder, the pump-ports opening at the conclusions of alternate strokes of the pump, the pump-piston being driven oppositely to the engine-pistons.

41. In a two-cycle engine, the combination with inosculated cylinders, and a crank-shaft, of pistons working in said cylinders and connected to said shaft to start, move and stop together, and a charging pump driven by said shaft and including a piston and cylinder provided with an inlet port and an outlet port, both ports opened and closed solely by said piston, the piston being connected to said shaft to move always oppositely from said engine-pistons, the first of said engine-cylinders having an intake port opened by its engine-piston at the conclusion of drivstroke, and the second engine-cylinder having an exhaust port opened by its own engine-piston at the same time, whereby said intake port is closed by the engine-piston during nearly its entire cycle, said pump-cylinder charging the second engine-cylinder through the first engine-cylinder, and said pump-piston having intake and delivery ports connected through the pump-piston, the pump-ports opening at the conclusions of alternate strokes of the pump.

42. A balanced high-speed two-cycle internal combustion-engine having a crank-shaft in combination with a series of groups each forming a compacted unit that includes ported engine and pump cylinders, the engine-cylinders in each unit being inosculated, the engine-cylinders having port-controlling pistons connected with crank-wrists, and the pump-cylinders having port-controlling pistons connected to crank-wrists that are diametrically opposite to the engine-wrists associated therewith, all the pistons being connected to their crank-wrists by heads fixed to the pistons and having cross-slot articulations to the wrists, the reciprocatory engine-parts in each unit being equal in weight to the reciprocatory pump-parts in the same unit.

43. A high-speed two-cycle internal combustion-engine having a crank-shaft in combination with a series of groups each forming a unit that includes ported engine and pump cylinders, the engine-cylinders in each unit being inosculated, the engine-cylinders having port-controlling pistons connected with crank-wrists, and the pump-cylinders having port-controlling pistons connected to crank-wrists that are diametrically opposite to the engine-wrists associated therewith, all the pistons being connected to their crank-wrists by heads fixed to the pistons and having cross-slot articulations to the wrists, the reciprocatory engine-parts in each unit being equal in weight to the reciprocatory pump-parts in the same unit, the pump-cylinders being contiguous to the engine-cylinders served thereby, and having intake and engine-charging ports that are arranged in each pump-cylinder to be closed during the intake stroke to produce a vacuum and opened at the end of that stroke to admit a fresh charge, and closed during the return stroke to compress the fresh charge, and opened at the conclusion of the compression stroke to communicate with the engine-cylinders to replace the exhaust gas therein with the fresh charge at pressure reduced to the desired point by reason of the compressed charge from the pump-cylinder expanding through the engine-cylinders.

44. A high-speed two-cycle internal combustion-engine having a crank-shaft in combination with a series of groups each forming a unit that includes ported engine and pump cylinders, the engine-cylinders in each unit being inosculated, the engine-cylinders having port-controlling pistons connected with crank-wrists, and the pump-cylinders having port-controlling pistons connected to crank-wrists that are diametrically opposite to the engine-wrists associated therewith, all the pistons being connected to their crank-wrists by heads fixed to the pistons and having cross-slot articulations to the wrists, the reciprocatory engine-parts in each unit being equal in weight to the reciprocatory pump-parts in the same unit, the pump-wrists of the crank-shaft being each weighted for balancing the crank-wrists of the engine served by the pump, and being located between said engine-wrists.

45. An engine constructed according to claim 42, in which each pump-piston is laterally out of line with the engine-cylinders served thereby, and the inosculated engine-cylinders are in close proximity to each other, each cross-slotted pump-head having offset relation to the engine-piston heads in the same unit.

BURNHAM C. STICKNEY.